United States Patent [19]

Brockman et al.

[11] Patent Number: 5,608,996
[45] Date of Patent: Mar. 11, 1997

[54] SHELTER WALL ASSEMBLY FOR TRUCK/TRAILER TERMINAL DOCKS

[75] Inventors: Thomas R. Brockman, Kenton; Mark Dillon, Upper Sandusky, both of Ohio

[73] Assignee: Fairborn USA Inc., Upper Sandusky, Ohio

[21] Appl. No.: 544,217

[22] Filed: Oct. 17, 1995

[51] Int. Cl.⁶ ................................................. E04H 14/00
[52] U.S. Cl. ............................................ 52/173.2; 52/98
[58] Field of Search ......................... 52/173.2, 83, 2.12, 52/204.66, 2.13, 2.14, 98; 49/504, 505

[56] References Cited

U.S. PATENT DOCUMENTS

| | | | |
|---|---|---|---|
| 3,875,954 | 4/1975 | Frommelt et al. | 52/173.2 X |
| 4,365,452 | 12/1982 | Fillman et al. | 52/173.2 |
| 4,381,631 | 5/1983 | Frommelt | 52/173.2 |
| 4,494,341 | 1/1985 | Schwab | 52/173.2 |
| 4,554,768 | 11/1985 | Srajer | 52/173.2 |
| 4,682,382 | 7/1987 | Bennett | 52/173.2 X |
| 4,873,800 | 10/1989 | Frommelt et al. | |
| 5,345,733 | 9/1994 | Brockman et al. | |
| 5,467,563 | 11/1995 | Borchardt | 52/173.2 |
| 5,473,846 | 12/1995 | Giuliani et al. | 52/173.2 |

FOREIGN PATENT DOCUMENTS

| | | | |
|---|---|---|---|
| 958946 | 12/1974 | Canada | 52/173.2 |
| 2930295 | 2/1981 | Germany | 52/173.2 |
| 2930611 | 2/1981 | Germany | 52/173.2 |
| 3049358 | 7/1982 | Germany | 52/173.2 |

*Primary Examiner*—Carl D. Friedman
*Assistant Examiner*—Aimee E. McTigue
*Attorney, Agent, or Firm*—David H. Semmes

[57] ABSTRACT

A shelterwall assembly for a storage dock, characterized by its protrusion from the docks, beneath its canopy and the optional use of additional guarding because of its "breakaway" column feature. It is particularly useful when the storage dock has side-by-side openings for the simultaneous loading and off-loading of open truck/trailers which have been backed into registry with the dock. The units herein are anchored above and below the dock opening to provide swingable curtains that fill the gap between vehicle and building. Provision is made for optional winter or summer positioning and a lockout assembly coacts with curtain supports to retain the curtains against displacement, once they have been set.

5 Claims, 2 Drawing Sheets

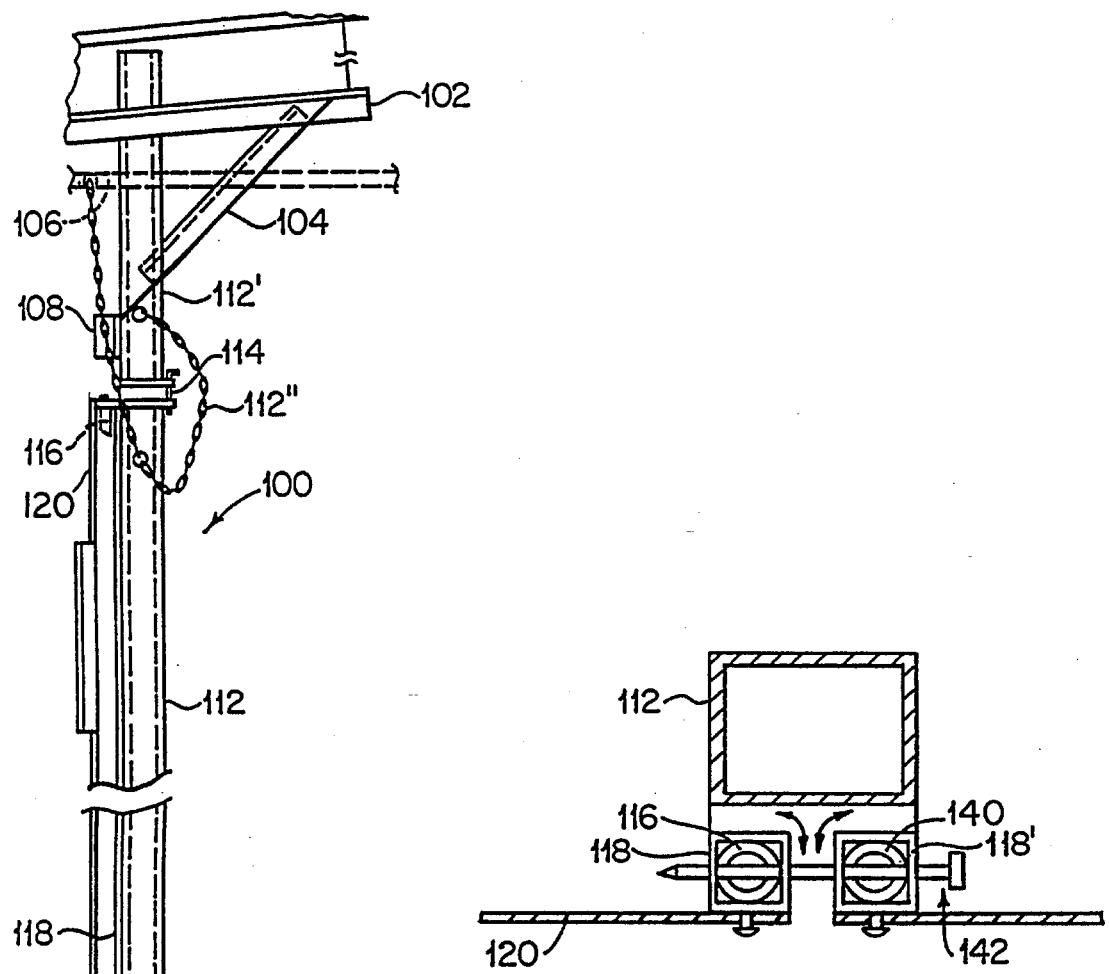
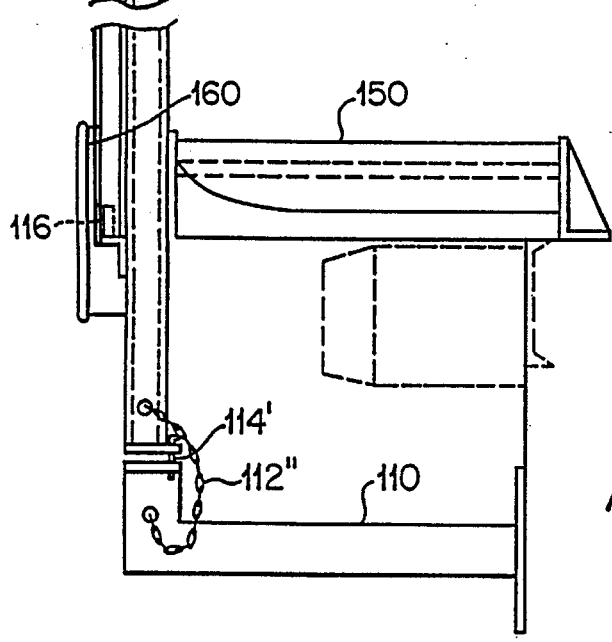
FIG. 2
FIG. 3

SHELTER WALL ASSEMBLY FOR TRUCK/TRAILER TERMINAL DOCKS

CROSS REFERENCE TO THE RELATED APPLICATIONS

1. Background of the Invention

In the loading and off-loading of trucks, more specifically, tractor-trailer trucks, it is desirable to simultaneously seal the gaps between the opened vehicle and the terminal dock, against inclement weather in wintertime. In the summertime, it is also important to retain air conditioning within the warehouse. Likewise, it is desirable to provide such a combined dock seal and shelter as will be able to withstand substantial wind, weather and vehicular abuse. Accordingly, the present invention is adapted to provide at a given warehouse dock, side-by-side protective shelter units that present a weather-resistant seal between truck/trailers and dock doors when the rear doors of the truck/trailer are open. Such a dock shelter must not only permit complete and unobstructed trailer access, but also provide outstanding weather protection. The connected shelters herein are mounted beneath a canopy and along the outer perimeter of the door openings of the warehouse or terminal building. These Shelter Wall Assemblies herein feature breakaway side columns, incorporating shear pins above and below potential trailer contact areas, fixed head curtain frames and pivoting side curtain frames, allowing 90° vertical rotation with means of retention in both summer or winter positions.

2. The Prior Art

There follows a listing of the patented art as it relates to the curtain assembly of this invention:

THE PRIOR ART

| INVENTOR | DATE | PAT. NO. | DESCRIPTION |
| --- | --- | --- | --- |
| Frommelt et al. | Apr. 8, 1975 | 3,875,754 | Loading Dock Seal |
| Frommelt et al. | Oct. 17, 1989 | 4,873,800 | Loading Dock Seals |
| Brockman et al. | Sept. 13, 1994 | 5,345,733 | Truck/Trailer Gap Fill Closure |

In none of the aforecited patents are the combinations of the present side-by-side curtain closure shown or described. The following description, drawings and claims define the distinctive, coactive relationship of key elements of the invention.

SUMMARY OF THE INVENTION

Upon opening a warehouse loading door to gain access to a parked tractor/trailer, there is an exchange of inside and outside air that causes building energy loss. With an open, unsealed 8'×8' loading door, this may currently cost some thousands of dollars a year per door in heating energy loss and in excess of a thousand dollars a year per door in air conditioning energy loss. (Research reported by Plant Engineering, May 1984.)

These are loading dock shelters with closure elements wherein reinforced head assemblies and side assemblies seal top, side and corner/hinge areas after truck/trailers have been backed into a loading dock, to thereby form protective weather seals between truck and dock openings. The present closures, having resilient side curtain and head curtain assemblies for side-by-side dock openings of the shelter, are each adapted to be offset and parallel to the upright door jambs of the dock. When the truck/trailer is in the dock, gaps will develop between dock door jambs above, to the right and to the left of the open door of the truck. These gaps will be of variant expanse, dependent upon the height and off-center disposition of the vehicle, relative to the center of the dock opening. The combination of this invention provides resilient fixed head curtains and side curtains which will adjust to variations in the gaps which are left and right of the dock opening and which usually overlap sides of the vehicle. To effect these functions, head curtains and side curtains are positioned parallel to the building face in anticipation of enclosing top ends and side ends of a docking truck/trailer. Each attached head and side curtain element is spring pressure applied toward the dock openings, to seal the gap between trailer and shelter. Left and right assemblies are independently moveable. Thus a seal is presented between the open doors of the truck/trailer and the dock.

BRIEF DESCRIPTION OF THE DRAWINGS

FIG. 2 is a schematic side elevation view of the invention depicted in FIG. 1, illustrating the head and side curtain support elements;

FIG. 3 is an enlarged partial view in section, depicting one side curtain mounting unit of the FIG. 2 assembly, taken along the lines 3—3 of FIG. 1.

DESCRIPTION OF PREFERRED EMBODIMENTS

Figure 1:
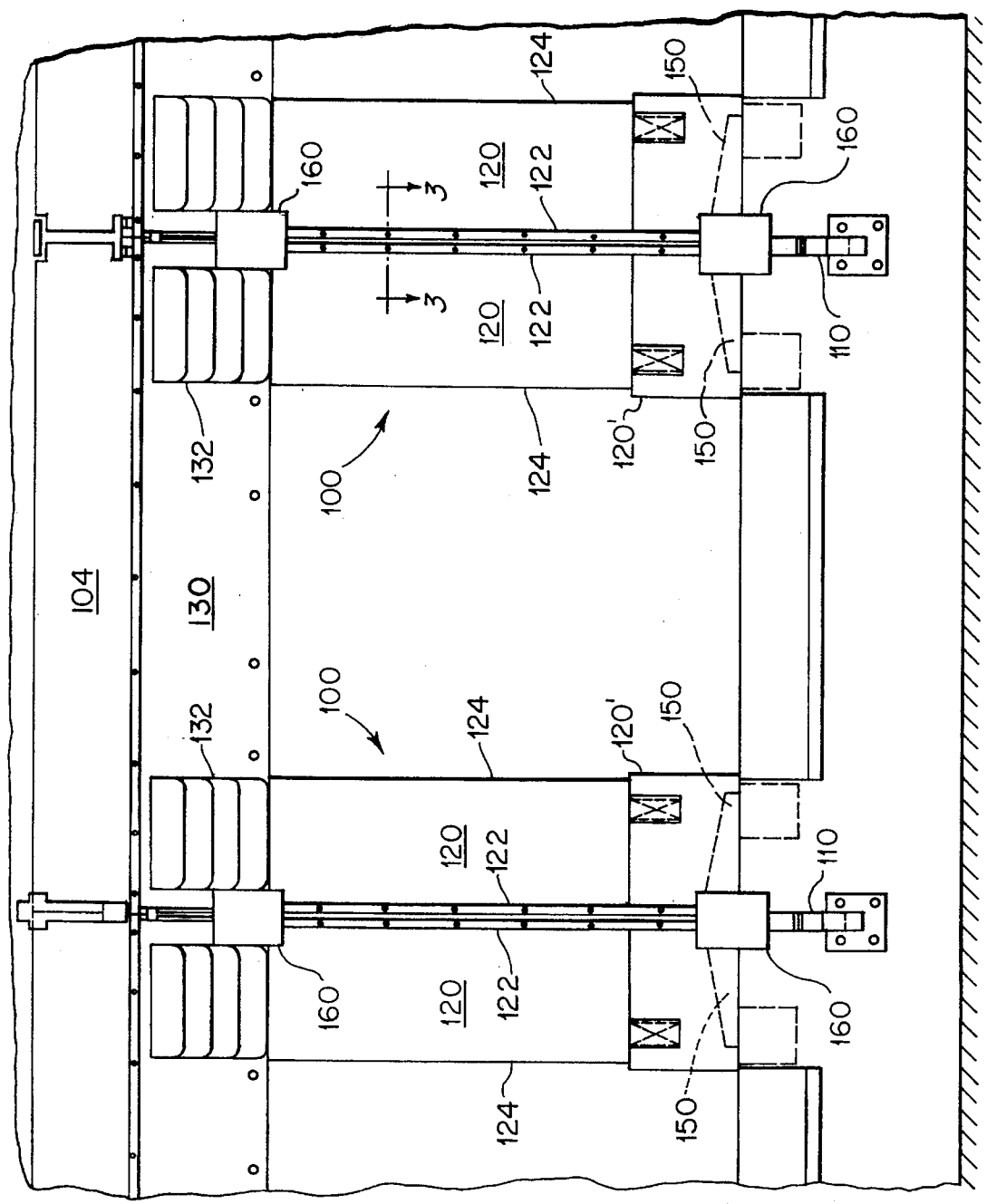
FIG. 1 is a view in elevation of a complete dock shelter with head curtain and side curtains, according to the invention.

A conventional terminal building usually has multiple dock positions with appropriate vehicle bumpers protruding below the dock. The dock positions may have no wall structure between them the respective openings and bumpers simply comprising loading-unloading positions along the wall. Often the dock positions are located side-by-side. It is to such building docks that the present invention inures. See FIG. 1.

Each shelter wall 100 is adapted to placement at side-by-side dock openings and is coactively set relative to conventional canopy joists 102. Shelter frames are thus secured at their top to the underside of canopy joists and secured at their bottom to protruding base frames 110. These base frames 110 fixedly engage see FIG. 2 tubular steel vertical supports, also known as breakaway side columns, by means of vertical formed steel tubing supports 112. The tubing supports are being extended at their tops by vertical extension 112. The companion elements 112—112' are connected together by two (2) safety chains 112", the primary safety chain connects supports 112 snugly to horizontal steel cables 106' fixed to canopy/roof supports. The lower most secondary safety chains 112" connect supports 112 to fixed extensions 112'. The extensions 112' of supports 112 are retained in alignment by means of shear pins 114, whereby upon a vehicular override, the pins will save the main supports 112 from bending. A similar arrangement of parts anchors the unit to base from 110 safety chain.

Vertical tubing extensions 112' are also horizontally connected by means of fixed steel tubing head curtain supports 108. See FIG. 2 Head curtains 130, incorporating resilient stays and fabric wear pleats 132, are secured to these same supports 108 and distend vertically downward into the path of and forming a seal against the rear, top of docking trailers.

The steel tubing supports 112 include, at their lowermost and uppermost positions, dual pivot mounts 116 and 116' for curtain frames 118 and 118'. The curtain frames 118 and 118' are set onto the mounts of the steel tubing supports 112—112' and are spaced from those supports 112 by means of the displaced pivot mounts 116 and 116'. Side curtains 120 engaging the curtain frames 118 and 118', include resilient stays 126 (not shown) secured to the tubular steel frame elements and extend horizontally into the dock opening (winter position). The anchor ends 122 of the curtains engage the axis of rotation of frames 118 adjacent their juncture. Free ends 124 of the curtains are rotatable inwardly and outwardly, the inward rotational position being defined as the summer position. The side curtains 120 are each provided with a reinforced dependent skirt 120' which is adapted to engage a corresponding bottom pad 150 upon rearward rotation.

As shown in FIG. 3, a curtain frame lockout assembly 140 is set into each set of curtain frames 118 and 118' to prohibit rotation. This lockout mechanism includes an insert pin 142. Alignment of the adjacent curtain frames 118 and 118' and insertion of the pin 142 may be effected to secure the side curtains in the winter position see FIG. 1. Side curtains 120 may be placed in the open (summer) position by removal of the insert pins 142, where upon rotation of each side curtain 90° will place the side curtains perpendicular to the building face and by using these described mechanical means to secure the side curtains, thus.

Face guards 160 are positioned for impact in the event of a misaligned trailer. The bottom pads are hinge mounted to the dock whereby ladder access may be provided to the dock from the roadway.

Referring to FIG. 1, a top seal is created by fastening a fabric top cover 104 from the top of horizontal head curtain support 108, FIG. 2 to the underside of the building canopy joists 102.

End gaps at terminations of multiple shelter wall runs are sealed by securing translucent filler panels in place, perpendicular to the building face, extending to the breakaway columns, supports 112.

The invention is limited only by the scope of the claims wherein:

We claim:

1. In a warehouse building having side-by-side dock doors to receive open truck/trailers for loading and unloading, the combination with a building canopy of connected wall mounted gap fill closures (100), each comprising:

a) spaced apart common base frames (110), anchored to a building wall beneath adjacent dock doors, the base frames (110) bearing vertical tubing supports (112) upon which adjacent side curtain frames (118—118') are respectively pivoted for transverse rotation, each said tubing support (112) having a top extension (112') and displaceable bottom which rests upon the base frame (110), aligning shear pin connections (114—114') and safety chains (112") linking the top extension (112') to the tubing support (112) and to the base frame (110) respectively;

b) resilient left-hand and right-hand side curtains (120) each curtain being swingably mounted at an anchor end (122) upon adjacent side curtain frames (118—118'), each side curtain (120) being cantilevered at a free end thereof;

c) a summer/winter side curtain lockout assembly (140), mounted upon the tubing support (112) the lockout assembly having supporting connection with side-by-side adjacent curtain frames (118—118'), said lockout assembly comprising a removable insert pin (142) bearing in and through supported side curtain frames (118—118').

2. The combination of claim 1, wherein the tubing supports (112) are anchored at their respective top extensions (112') to the canopy of the bulding.

3. The combination of claim 2 wherein the tubing supports (112) bear side-by-side pivot mounts (116) for the curtain frames (118—118').

4. The combination of claim 3 said tubing supports (112) having shear pin (114) connection at the top extension (112') thereof with a corresponding shear pin (114') connection of the tubing support (112) to base frame (110).

5. The combination of claim 4 including flexible side curtain extensions (120') depending from respective side curtains; corresponding bottom pads (150) on the building, said pads declining in slope between adjacent curtains (120), to ends thereof, whereby the curtain extensions (120') may flexibly traverse the bottom pads (150) upon side curtain rotation to a selected alternate position.

* * * * *